Aug. 22, 1939.                J. A. SMITMANS                2,170,667
                           WATER LUBRICATED BEARING
                            Filed May 18, 1935          2 Sheets-Sheet 2
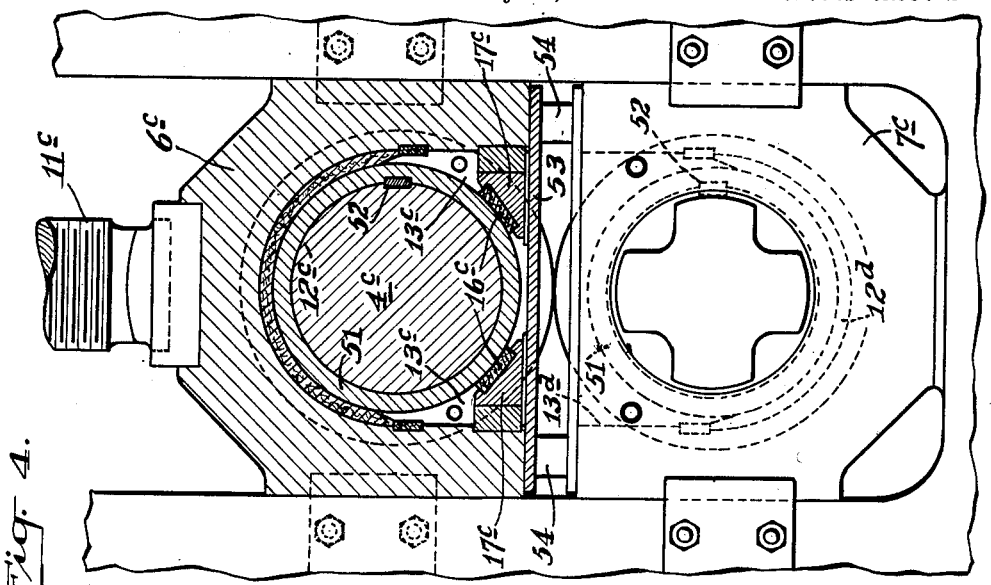
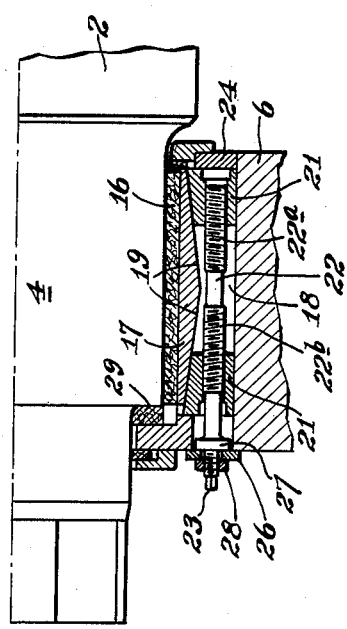
WITNESSES                                     INVENTOR.
                                              John A. Smitmans
                                          BY Brown, Critchlow & Flick
                                                      his ATTORNEYS.

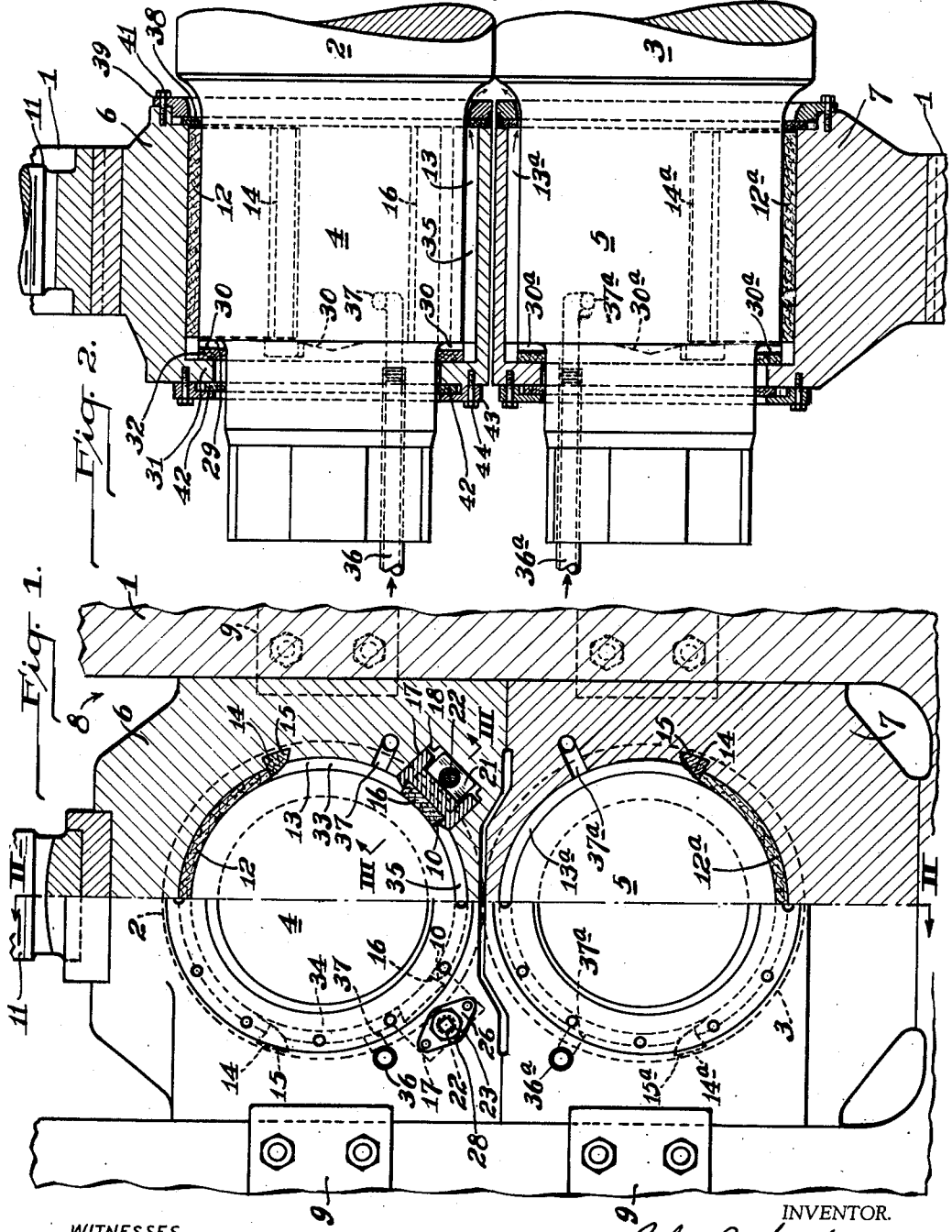

Patented Aug. 22, 1939

2,170,667

UNITED STATES PATENT OFFICE 2,170,667

WATER-LUBRICATED BEARING

John A. Smitmans, Pittsburgh, Pa., assignor to United Engineering & Foundry Company, Pittsburgh, Pa., a corporation of Pennsylvania Application May 18, 1935, Serial No. 22,165

10 Claims. (Cl. 308—76)

This invention relates broadly to bearings, and more particularly to a bearing construction devised for use on the roll necks of a rolling mill.

In certain types of mills, and especially hot roughing mills in which the rolls are subjected to the extreme heat of the material being worked and to the rather severe shocks produced by the entrance in and discharge from the mill of the work-pieces which are relatively short, friction type bearings have been found to be more satisfactory than roller type bearings. Their lubrication and cooling, however, as previously accomplished, as well as the difficulty accompanying their installation and replacement, leave considerable to be desired.

With this in mind it is an object of this invention to provide an improved bearing of the character referred to which is of simple and dependable construction, easy to install and replace and in which water may be employed as both a lubricant and a cooling agent.

Another object is to provide a bearing of this kind in which corroding of the wearing surfaces, due to the use of water as a lubricant, is eliminated as a problem in the operation of the bearing.

A still further object is to provide a bearing embodying the aforementioned features which is also adapted to be readily adjusted to eliminate play between the bearing surfaces and the roll neck as the bearing surfaces wear away, and which is highly desirable especially on the upper rolls of a mill where it is essential to eliminate as much of this play as is possible if the life of the bearing is to be prolonged.

These and various other objects as well as the various other novel features and advantages of the invention will be apparent when the following detailed description is read in conjunction with the accompanying drawings, of which Fig. 1 is an elevational view, showing a part thereof in section, of a bearing assembly constructed in accordance with the invention as applied to the roll necks of a rolling mill; Fig. 2 a sectional view taken on the line II—II of Fig. 1; Fig. 3 a detailed section taken on the line III—III of Fig. 1; and Fig. 4 a view similar to Fig. 1 of a modified form of the invention.

Referring in detail to the drawings, and first more particularly to Figs. 1 to 3, the numeral 1 designates one of the roll housings of the mill, and the numerals 2 and 3 the working rolls, the necks 4 and 5 of which are mounted in single-piece chucks 6 and 7 held in place in the window 8 of the housing by suitable removable clamps 9. The lower of these chucks is rested, in the usual fashion, on the base of the housing window and the upper one disposed for vertical adjustment by an adjusting screw 11 to vary the size of the roll pass.

In accordance with this invention a part circle bearing 12, in the nature of a sleeve bearing which may be varied somewhat in size and thickness and made of any suitable non-corroding bearing material such as bronze or a non-metallic composition, a number of which are available on the market, is mounted in the top of the roll neck receiving opening 13 in the upper roll chuck 6. This constitutes the main bearing surface on the upper chuck, being located between those portions of the chuck and roll neck where all of the working pressures are encountered, and is held in position by a pair of stops 14 fitted in slots 15 cut in the face of the neck opening 13 opposite the two ends of the bearing.

To hold the neck 4 of the roll 2 in contact with this main bearing 12 and thereby prevent hammering between the two when the work is entered between the rolls, a pair of narrow supporting bearings 16, made of material similar to that of the main bearing, is mounted in spaced relation in the bottom of the neck opening 13. As shown best in Figs. 1 and 3, to provide for radially adjusting these latter bearings so that they may be utilized to take up any play which develops as the bearing surfaces wear away, they are mounted in grooves 10 in the bottoms of inverted channel-shaped retainers 17 which are themselves mounted for radial adjustment in axially extending slots 18 in the bottom of the neck receiving opening 13. For adjusting these retainers their inner bottoms 19 are tapered downwardly toward their centers and they are rested at their ends on a pair of wedges 21 disposed to slide on the bottoms of the slots 18 between the walls of the retainers and raise the retainers when moved toward the centers thereof. For moving such wedges they are threadedly mounted on screws 22 which are provided with reverse threads 22a and 22b so that the wedges will be moved in opposite directions when the screws are turned and for turning them they are projected at one end through openings in the outer face of the chuck and provided with non-circular ends 23 for the reception of a turning tool. To prevent dirt getting into the slots 18 gates 24 are provided at their inner ends and the holes in the face of the chuck through which the screws 22 extend are enclosed with cover plates 26, while to lock the wedges in a selected position shoulders 27 are provided on the screws 22 adjacent the inner faces of the plates 26 and lock nuts 28 fitted on them against the outer face of such plates.

In order that the bearings and chucks may be easily installed and removed either by themselves or with the roll, the chuck is adapted to take the end thrust of the roll at the outer end of the roll neck instead of the inner end as is the usual practice. To accomplish this the roll neck is provided with a shoulder 29 adjacent its outer end and the chuck with an internally projecting flange 31 at the outer end of the neck receiving opening 13 to engage such shoulder and because of the wear between these parts a flat annular bearing 32 is mounted between them. In the face of this bearing there is provided a plurality of circumferentially spaced radially extending wedge-shaped lubricating grooves 30 into which the lubricant supplied to the bearing, as will presently appear, may flow and be effectively supplied to the bearing surfaces.

Another advantage of taking care of the end thrust in this manner is that the neck of the roll can be made larger than it can when the end thrust is taken at the inner end of the neck as is usually done, and which is desirable. In addition the fillet between the neck and the roll can be more effectively rounded by such practice.

By reason of this arrangement of the bearing members in the roll neck receiving opening 13 of the chuck, and the size of the latter as indicated in the drawings, chambers 33, 34 and 35 are provided between such members through which a lubricant and cooling agent for the roll neck can be readily circulated. In the present instance, while other lubricants may be used, it is intended because of its cheapness that water will be used for such purpose and especially a water containing some suitable material which without gumming will form a coating on the surface of the roll neck and prevent corroding when the mill is idle, such materials which may also enhance the lubricating qualities of the lubricant being available on the market.

For supplying the lubricant to the bearing a pipe 36 connected to a suitable supply of water under pressure is connected to a pair of ports 37 in the face of the chuck 6 which communicate with the chambers 33 and 34, and to enhance the cooling capacity thereof the water is permitted to flow out the back of the circulating chamber onto the ends of the rolls and thence away from the mill or recovered and reused. To provide enough resistance to the flow to keep the chamber full of water and functioning properly a gasket 38 in the nature of a dam having a small opening between it and the roll neck is provided at the roll end of the opening 13 and held in place by a clamping ring 39 secured to the chuck by screws 41. To prevent the lubricant escaping at the outer end of the bearing a similar gasket 42 except that it fits tightly against the roll neck is provided at the outer end of the opening 13 and held in place by a clamping ring 43 secured by screws 44 to the chuck. As will be appreciated the thickness of the inner gasket 38 and the clearance between it and the roll neck may be varied to vary the flow of the water out of the end of the bearing onto the roll and that by such an arrangement a very economic and efficient means is provided for cooling and maintaining the bearing properly lubricated.

Except for the omission of the adjustable supporting bearing pieces 16 which are unnecessary therein as the roll neck is held against the main bearing 12a by the weight of the roll 3, the construction of the lower roll bearing is the same as that of the upper, which has just been described. For this reason the same numerals with the suffix a attached have been used to designate the different parts of the latter construction.

Referring to the modification of the invention illustrated in Fig. 4 a construction is provided in which the working parts of the bearing are rendered free from corroding so that pure water may be used as the lubricant and cooling agent. To accomplish this, referring again to the upper bearing assembly first, the bearing members 12c and 16c are made in the same manner as previously described, as is the lubricant-circulating equipment, not shown. The roll neck, however, is provided with a sleeve 51 which is made of suitable non-corroding material or material coated by electroplating or like process with a non-corroding material. This sleeve is in turn secured to the neck 4c by a key 52 so that it may be readily removed or replaced. It will also be apparent that the neck of the roll may also be coated in the same manner to accomplish the same end although such practice is somewhat impracticable.

In this installation instead of a single-piece encircling chuck, one having a U-shaped opening 13c is provided and in place of the supporting bearing pieces 16c being radially adjusted they are simply mounted in supports 17c which are slid into the opening 13c and held in place by a cover plate 53 provided at the open end of the chuck and either attached to the chuck or held in place by the plungers 54 of the roll balancing equipment.

In this modification as in the one previously described the main bearing member 12d which is mounted in the bottom of the opening 13d need be the only one used in the lower chuck. Otherwise the latter assembly is the same as the upper one.

While not shown, this construction also contemplates the end thrust of the roll being carried at the outer face of the chuck and the lubricant retained therein by suitable sealing means. The lubricant is supplied in the same fashion as in the previous embodiment of the invention to the chambers determined by the part circle bearing plates 12c and 12d and it is passed not only as a lubricant but as a cooling agent through the bearing and out of the rolls by way of a damming seal, not shown, on the inner end of a chuck.

To reiterate, in accordance with this invention a bearing is provided in which water or other inexpensive medium may be used as both a lubricant and a cooling agent, and in which hammering between the roll neck and the bearing in the upper chuck is eliminated as well as a construction which can be readily applied or removed and replaced as a unit either by itself or with the roll.

According to the provisions of the patent statutes, I have explained the principle and mode of operation of my invention, and have illustrated and described what I now consider to represent its best embodiments. However, I desire to have it understood that, within the scope of the appended claims, the invention may be practiced otherwise than as specifically illustrated and described.

I claim:

1. In a rolling mill, a roll neck supporting chuck having a roll neck receiving opening therein, a multiple part bearing mounted with said parts in spaced relation in said chuck to engage the roll neck, means for supplying under pressure a lubricating and cooling medium to said chuck opening, and an adjustable ring shaped gland secured to the chuck at one end of the bearing for regulating the escape from the bearing of said medium between the bearing and roll neck about its circumference in such a way as to prevent dirt getting into the bearing from the mill.

2. In a rolling mill, a roll neck supporting chuck having a roll neck receiving opening in it, a bearing consisting of circumferentially spaced parts comprising the main bearing element of the chuck mounted therein to engage the roll neck, means for supplying under pressure a lubricating and cooling medium to the opening in said chuck, means for preventing said lubricant from escaping at one end of the chuck, and a ring shaped gland disposed to fit around the roll neck and adjustably secured to the chuck for resisting and regulating its escape at the other end between the bearing and roll neck about its circumference in such a way as to prevent dirt getting into the bearing from the mill.

3. In a rolling mill, a roll neck supporting chuck having a roll neck receiving opening in it, a bearing consisting of a plurality of circumferentially spaced parts mounted therein to take the wear of the roll neck, means for maintaining the roll neck in contact with said bearing, means for supplying a lubricating and cooling medium to said opening, means for preventing said medium escaping from one end of the opening, and a ring shaped gland disposed to fit around the roll neck and adjustably secured to the chuck for resisting and regulating its escape at the other end between the bearing and roll neck about its circumference in such a way as to prevent dirt getting into the bearing from the mill.

4. In a rolling mill, a roll neck supporting chuck having a roll neck receiving opening in it, a part circle bearing replaceably mounted in said opening to take the roll neck wear, an inwardly projecting flange on the chuck at the outer end of said opening disposed to engage a shoulder on the roll neck and take the end thrust of the roll, a ring bearing mounted between said flange and shoulder having radially lubricating grooves therein, means for supplying a cooling and lubricating liquid to the portion of said opening not occupied by said bearings, means for prevening said liquid from escaping from one end of said opening, and means for regulating its escape from the other end.

5. In a rolling mill, a roll neck supporting chuck having a roll neck receiving opening in it, a main part circle bearing mounted in the top of said opening to take the roll neck wear, a pair of segmental bearings mounted in spaced relation in the bottom of said bearing for holding the roll neck against said main bearing, means for radially adjusting said segmental bearings to take up the play as the bearing surfaces wear away, means for supplying a cooling and lubricating liquid to one end of said opening, and a ring shaped gland disposed to fit about the roll neck and adjustably secured to the chuck for regulating its escape from the other end between the bearing and roll neck about its circumference in such a way as to prevent dirt getting into the bearing from the mill.

6. In a rolling mill, a roll neck supporting chuck, a roll neck mounted in an opening in said chuck, a part circle bearing mounted in the top of said opening to take the roll neck wear, a pair of spaced bearing members mounted in the bottom of said opening to engage said roll neck, means for radially adjusting said members to maintain said neck against said part circle bearing, an inwardly projecting flange at the outer end of said neck opening, a shoulder on said neck opposite said flange, a ring bearing having radially extending lubricating grooves in it arranged between said neck shoulder and chuck flange, means for supplying a lubricating and cooling fluid to the outer end of said neck opening, means for preventing said fluid escaping from the outer end of the chuck, and means for controlling its escape from the inner end.

7. A combination according to claim 1 in which interengaging shoulders are provided at the outer ends of said chuck and roll neck for resisting the end thrust of the roll.

8. A combination according to claim 1 in which means is provided at the outer end of the chuck for resisting the end thrust of the roll.

9. In a rolling mill, a roll neck supporting chuck having a roll neck opening therein, a bearing mounted in said chuck to engage the roll neck, means for supplying a lubricating and cooling medium to said chuck opening, means at one end of the bearing comprising a ring shaped gland held in place by a releasable clamp for regulating the escape from the bearing of said medium between the bearing and roll neck about the circumference thereof in such a way as to prevent dirt getting into the bearing from the mill, and an inwardly projecting annular flange on the chuck at the outer edge of said opening disposed to engage a radial surface on the roll neck and take the end thrust of the roll.

10. In a rolling mill, a roll provided with a roll neck having a non-corroding and wear-resisting sleeve mounted on the neck thereof, a chuck provided with an opening therein for receiving said neck and sleeve, a part circle bearing replaceably mounted in said chuck opening, an inwardly projecting flange at the outer end of said chuck opening disposed to engage a shoulder provided on the roll neck for resisting end thrust, a ring bearing mounted between said flange and shoulder, means for supplying a cooling and lubricating medium under pressure to the portion of said chuck opening not occupied by said part circle bearing, means for preventing said cooling and lubricating medium from escaping from the outer end of said bearing, and means for regulating its escape onto the end of the roll from the other end of the bearing.

JOHN A. SMITMANS.